(12) United States Patent
Kihara

(10) Patent No.: US 7,876,857 B2
(45) Date of Patent: Jan. 25, 2011

(54) DATA RECEIVING APPARATUS

(75) Inventor: Hideyuki Kihara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1010 days.

(21) Appl. No.: 11/676,747

(22) Filed: Feb. 20, 2007

(65) Prior Publication Data

US 2007/0201104 A1 Aug. 30, 2007

(30) Foreign Application Priority Data

Feb. 28, 2006 (JP) ............................. 2006-053927

(51) Int. Cl.
*H04L 27/06* (2006.01)
(52) U.S. Cl. ...................... 375/316; 375/340
(58) Field of Classification Search ................ 375/244, 375/272, 283, 286, 288–291, 316, 318, 322, 375/257, 329–330, 340; 327/50, 63–64, 327/231, 233, 246, 261, 269, 272, 274; 330/252; 710/313; 358/434; 307/101, 307
See application file for complete search history.

(56) References Cited

U.S. PATENT DOCUMENTS

| | | | | |
|---|---|---|---|---|
| 5,742,644 | A * | 4/1998 | Campana, Jr. ............... | 375/316 |
| 6,278,750 | B1 * | 8/2001 | Yu ............................. | 375/345 |
| 7,498,858 | B2 * | 3/2009 | Desai et al. ................. | 327/246 |
| 2006/0080564 | A1 * | 4/2006 | Chang et al. ................ | 713/400 |
| 2007/0046335 | A1 * | 3/2007 | Becker et al. ............... | 326/93 |
| 2007/0069768 | A1 * | 3/2007 | Hatooka et al. ............. | 327/74 |

FOREIGN PATENT DOCUMENTS

JP 2001-148719 5/2001

OTHER PUBLICATIONS

English Language Abstract of JP-2001-148719.

* cited by examiner

*Primary Examiner*—Tesfaldet Bocure
*Assistant Examiner*—Lawrence B Williams
(74) *Attorney, Agent, or Firm*—Greenblum & Bernstein, P.L.C.

(57) ABSTRACT

A data receiving apparatus which makes it possible to obtain reliable received data during EOP period and a preceding period, and which makes it possible to receive serial data in a reliable manner. Data receiving apparatus 100 is provided with receiving comparator 102 which has first signal line 101*a* and second signal line 101*b* for differential input; NOR circuit 105 that outputs a logical output, as a trigger signal, at the time the first signal and the second signal have changed from out-of-phase to in-phase; and D-FF circuit 107 that retrieves, by means of a trigger signal from NOR circuit 105, and holds an output RCV of receiving comparator 102; wherein selection circuit 108 selects the output of receiving comparator 102, when the first signal of first signal line 101*a* and the second signal of second signal line 101*b* are out-of-phase with each other, and outputs, as received data, a value held in D-FF circuit, when the first signal and the second signal have changed from out-of-phase to in-phase.

14 Claims, 12 Drawing Sheets

DATA RECEIVING APPARATUS

CROSS-REFERENCE TO RELATED APPLICATIONS

The disclosure of Japanese Patent Application No. 2006-053927, filed on Feb. 28, 2006, including the specification, drawings and abstract, is incorporated herein by reference in its entirety.

BACKGROUND OF THE INVENTION

1. Field of the Invention

The present invention relates to an interface for USB (Universal Serial Bus) devices. More particularly, the present invention relates to a data receiving apparatus that receives serial data of a first signal line and a second signal line.

2. Description of the Related Art

USB is drawing attention as an interface standard for connecting a personal computer and peripheral devices. The USB is a method for transmitting serial data using two signal lines. In the case of receiving a USB signal, in a receiving circuit, two signal lines are connected to a positive input terminal and a negative input terminal of a receiving comparator, and the receiving comparator outputs two differential signals. When the two signal lines are both low level, they become an EOP (End-of-Packet) period of several bits which indicates the end of a packet in particular, and since the noise of each signal line and the minimal difference in the potentials of the two signals is applied to the receiving comparator, there are cases where the output of the receiving comparator is not reliable. Accordingly, when the receiving comparator inputs are out-of-phase, a usual differential output is carried out, and when it is EOP at which both signal lines are low level, a special correction circuit is required to stabilize the output of the receiving comparator. In patent document 1 (Japanese Patent Application Laid-Open No. 2001-148719), a data receiving apparatus is disclosed which has a correction circuit for stabilizing the output of the receiving comparator.

FIG. 1 shows a circuit diagram of a conventional data receiving apparatus in which, in the case of EOP, the output of the receiving comparator is forcibly stabilized.

In FIG. 1, 1 denotes a USB connector, 2 denotes data receiving apparatus 2 to be connected to USB connector 1, and USB connector 1 is provided with first and second signal lines 3a and 3b for serial transmission of data and first and second power lines 4a and 4b for power supply. Data receiving apparatus 2 is a USB transceiver and is comprised of receiving comparator 5, noise canceling circuits 6 and 7 comprised of a Schmitt trigger circuit, NOR circuit 8 and OR circuit 9. At an implementation level, data receiving apparatus 2 corresponds to a PHY (physical layer) of a USB interface circuit, and an output signal and a connection detection signal are transmitted to subsequent electronic device 11.

A positive input terminal of receiving comparator 5 is connected to first signal line 3a, and a negative input terminal of the receiving comparator 5 is connected to second signal line 3b. Also, noise canceling circuit 6 and noise canceling circuit 7 are connected to first signal line 3a and second signal line 3b, and the outputs of noise canceling circuit 6 and noise canceling circuit 7 become the input of NOR circuit 8, and output RCV of receiving comparator 5 and the output of NOR circuit 8 are inputted to OR circuit 9. Output 10 of OR circuit 9 becomes the output.

A description will be given of the operation of data receiving apparatus 2 having the above configuration.

FIG. 2 and FIG. 3 are operation waveform diagrams showing a voltage condition of the above data receiving apparatus 2.

In FIG. 2, times t1~t4 show packet transmission, out-of-phase signals are inputted at 3a and 3b, and output RCV of receiving comparator 5 outputs a differential signal thereof. The RCV is inputted to OR circuit 9, and since the output of NOR circuit 8 is low level, it is outputted as output 10 which is in-phase with the RCV, and ends with output 10 being high level in times t3~t4. Times t4~t6 show an EOP state, and first signal line 3a and second signal line 3b both become low level. For this reason, output RCV of receiving comparator 5 becomes unreliable due to the influence of noise and the minimal difference in potential between 3a and 3b, and this condition is shown by the hatched portion in FIG. 2. Also, since outputs VP and VM of noise canceling circuit 6 and noise canceling circuit 7 are low level and the output of NOR circuit 8 becomes high level, output 10 of OR circuit 9 is fixed at a high level, irrespective of the condition of the RCV signal.

As described above, at the time of packet transmission, a differential signal is obtained, as RCV output, from output 10 of OR circuit 9, and since immediately before changing to EOP state, output 10 of OR circuit 9 ends at high level, and, after changing to EOP, output 10 of OR circuit 9 is fixed to a high level, irrespective of the RCV, it can change from packet transmission end time to EOP state, while being at a high level.

However, such a conventional data receiving apparatus presents a problem that USB communications during the EOP period and the preceding period are not reliable.

For instance, in the packet transmission immediately prior to changing to EOP state, if transmission ends with first signal line 3a at low level and second signal line 3b at high level, and since output 10 of OR circuit 9 becomes low level immediately prior to changing to EOP state, output 10 of OR circuit 9, at the time of changing from packet transmission to EOP state, changes from a low level to a high level.

FIG. 3 is an operation waveform diagram showing a change of the voltage condition of the above problem in detail. Similar to FIG. 2, periods t1~t3 show packet transmission, out-of-phase signals are inputted at 3a and 3b and output RCV of receiving comparator 5 outputs a differential signal thereof. However, in the period of t2~t3 which is the final period of the packet transmission, since first signal line 3a is low level and second signal line 3b is high level, output 10 of receiving comparator 5 becomes low level. Times t3~t5 show an EOP state at which first signal line 3a and second signal line 3b are both low level, and the output RCV of receiving comparator 5 becomes unreliable due to the influence of noise and the minimal difference in the potentials of 3a and 3b, this condition being illustrated by the hatched portion in FIG. 3. Also, since outputs VP and VM of noise canceling circuit 6 and noise canceling circuit 7 are both low level and the output of NOR circuit 8 is high level, output 10 of OR circuit 9 is fixed to a high level, irrespective of the condition of the RCV signal.

As described above, since output 10 of OR circuit 9 becomes low level in the final period t2~t3 of the packet transmission, output 10 of OR circuit 9 changes to high level in the EOP period t3~t5, a problem occurs that USB communications during the EOP period and the preceding period are not reliable.

SUMMARY OF THE INVENTION

A first object of the present invention is to provide a data receiving apparatus that makes it possible to obtain reliable received data during an EOP period and a preceding period, and to receive serial data in a reliable manner.

A second object of the present invention is to provide a data receiving apparatus that makes it possible to obtain reliable received data even when an error of the EOP should occur.

According to an aspect of the invention, there is provided a data receiving apparatus that receives serial data of a first signal line and a second signal line, the data receiving apparatus having: a comparator that uses the first signal line and the second signal line for differential input; a trigger generation section that generates a trigger signal before an output of the comparator switches, when the first signal and the second signal change from out-of-phase to in-phase; a storage section that retrieves, by means of the trigger signal, and stores the output before the comparator switches, when the first signal and the second signal change from out-of-phase to in-phase; and a selection section that, when a first signal of the first signal line and a second signal of the second signal line are out-of-phase with each other, selects the output of the comparator and outputs the output as received data, and, when the first signal and the second signal change from out-of-phase to in-phase, switches the output of the comparator to a value stored in the storage section and outputs the value as received data.

DETAILED DESCRIPTION OF THE PREFERRED EMBODIMENTS

Hereinafter, embodiments of the present invention will be described in detail with reference to the accompanying drawings.

Embodiment 1

Figure 4:
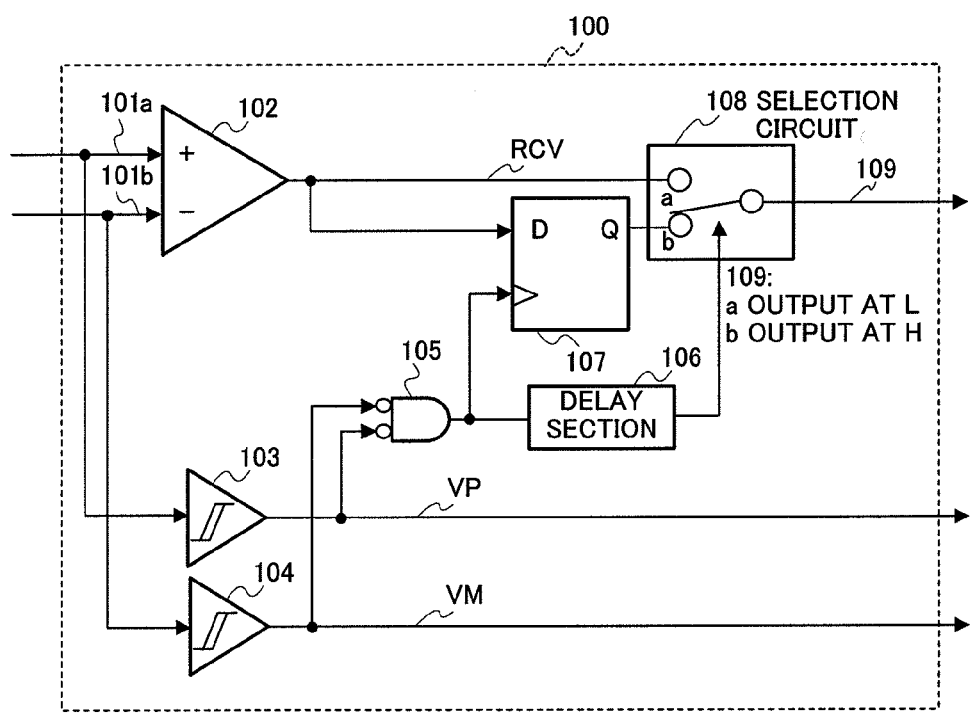
FIG. 4 is a circuit diagram showing a configuration of a data receiving apparatus according to embodiment 1 of the present invention.

FIG. 4 is a circuit diagram showing a configuration of a data receiving apparatus according to embodiment 1 of the present invention. The present embodiment is an example applied to a data receiving apparatus that receives USB data.

In FIG. 4, data receiving apparatus 100 comprises receiving comparator 102 which has first signal line 101a and second signal line 101b for differential inputs; noise canceling circuits 103 and 104 comprised of Schmitt trigger circuits; NOR circuit 105 which outputs a logical output, as a trigger signal, when a first signal and a second signal have changed from out-of-phase to in-phase; delay section 106 that delays an input signal by means of a multi-stage serial inverter; D-FF circuit 107 that retrieves, by means of the trigger signal from NOR circuit 105, and holds the output RCV of receiving comparator 102; and selection circuit 108 comprised of a CMOS logic circuit and adapted to select between and output the output RCV of receiving comparator 102 and output Q of D-FF circuit 107. Also, RCV is the output of receiving comparator 102, VP is the output of noise canceling circuit 103, VM is the output of noise canceling circuit 104, and 109 is the output of selection circuit 108.

A positive input terminal of receiving comparator 102 is connected to first signal line 101a, and a negative terminal of receiving comparator 102 is connected to second signal line 101b. Also, noise canceling circuit 103 and noise canceling circuit 104 are connected to first signal line 101a and second signal line 101b, and the outputs of noise canceling circuit 103 and noise canceling circuit 104 become the input signals of NOR circuit 105.

NOR circuit 105 generates a trigger signal before the output of receiving comparator 102 switches, when a first signal and a second signal change from out-of-phase to in-phase.

The output of NOR circuit 105 is connected to a clock input terminal of D-FF circuit 107, and the output RCV terminal of receiving comparator 102 is connected to a data input terminal of D-FF circuit 107. The output of NOR circuit 105 is further connected to the input of delay section 106, and selection circuit 108 is controlled by the output of delay section 106.

Delay section 106 delays the output of NOR circuit 105 and delays a control signal of selection circuit 108 beyond the clock of D-FF circuit 107, thereby giving selection circuit 108 the role of selecting between the RCV of receiving comparator 102 and the output Q of D-FF circuit 107 after D-FF circuit 107 retrieves the RCV output of receiving comparator 102.

D-FF circuit 107 has the function of retrieving the output RCV of receiving comparator 102 at the rising clock, and holds it at the Q terminal until the next rise. D-FF circuit 107 holds, by means of the trigger signal, an output before the receiving comparator 102 changes when the first signal and the second signal change from out-of-phase to in-phase.

Selection circuit 108 selects the output RCV of receiving comparator 102 and outputs output 109 when the output of delay section 106 is low level, and selects output Q of D-FF circuit 107 and outputs output 109 when the output of delay section 106 is high level. When the first signal of first signal line 101a and the second signal of second signal line 101b are out-of-phase with each other, selection circuit 108 selects the output of receiving comparator 102, and, when the first signal and the second signal have changed from out-of-phase to in-phase, outputs a value held in D-FF circuit 107, as received data.

The above receiving comparator 102 is comprised of an analog comparator, and noise canceling circuits 103 and 104, NOR circuit 105, delay section 106, D-FF circuit 107 and selection circuit 108 are comprised of gate circuits including a CMOS logic circuit. While receiving comparator 102 has a great operation delay because it is comprised of an analog comparator, circuits other than receiving comparator 102 have a small operation delay because they are comprised of CMOS logic circuits. Accordingly, the above logic circuits are configured to operate faster as a whole, with respect to receiving comparator 102.

Here, when transmission delay time of receiving comparator 102 is tdCON, transmission delay time of NOR circuit 105 is tdNOR, transmission delay times of noise canceling circuits 103 and 104 are tdSE, and transmission delay time of delay section 106 is tdDLY, the following equation (1) must be established.

$$tdSE+tdNOR+tdDLY<tdCON \quad (1)$$

Since receiving comparator 102 usually employs the form of a differential amplifier combining a plurality of MOS field-effect transistors (hereinafter MOS-FET) and bipolar transistor elements, the transmission delay time is likely to become long, and, since NOR circuit 105, noise canceling circuits 103 and 104, and delay section 106 are implemented by means of MOS logic circuits, the transmission delay time is easily shortened. For instance, if, when the transmission delay time tdCON of receiving comparator 102 is 15 ns, the transmission delay time of NOR circuit 105 is tdNOR=1 ns, the transmission delay time of noise canceling circuits 103 and 104 is tdSE=2 ns, and the transmission delay time of delay section 106 is tdDLY=4 ns, the following equation (2) is obtained which can satisfy the above equation (1).

$$tdSe+tdNOR+tdDLY=2\ ns+1\ ns+4\ ns=7\ ns \quad (2)$$

Figure 5:
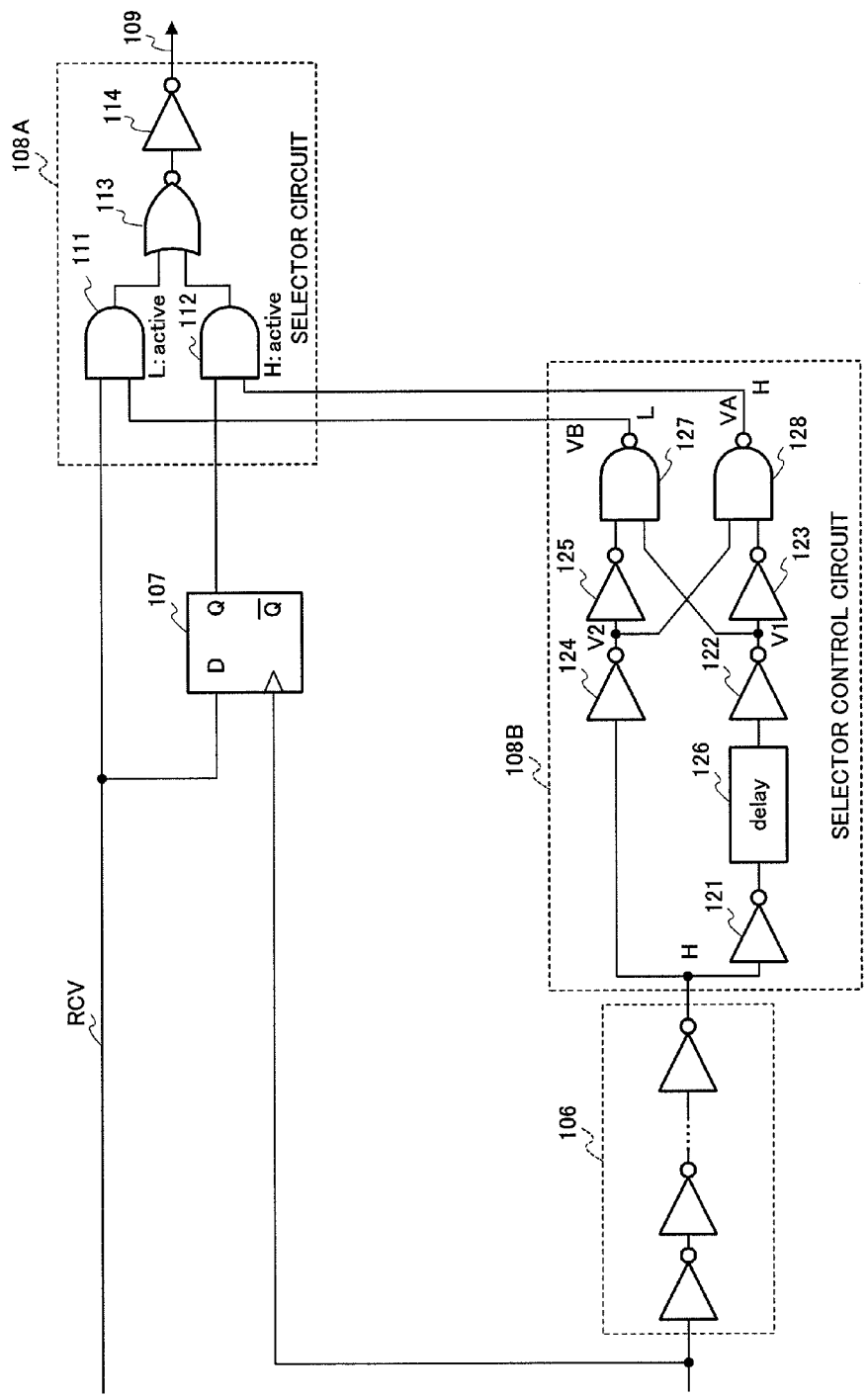
FIG. 5 is a view showing a detailed configuration of a delay section and selection circuit of the data receiving apparatus according to this embodiment.

FIG. 5 is a view showing a detailed configuration of delay section 106 and selection circuit 108 of the above data receiving apparatus 100.

In FIG. 5, delay section 106 is comprised of a multi-stage inverter and is adapted to generate as many delays as the number of stages. Selection circuit 108 is comprised of selector circuit 108A and selector control circuit 108B that controls selector circuit 108A, and selector circuit 108A is comprised of AND circuits 111 and 112, OR circuit 113 and inverter 114. Also, selector control circuit 108B is comprised of inverters 121~125, delay 126 and NAND circuits 127 and 128. Similar to delay section 106, the above delay 126 is comprised, for instance, of a serially-connected inverter.

Next, a description will be given of the operation of data receiving apparatus 100 having the above configuration.

Figure 6:
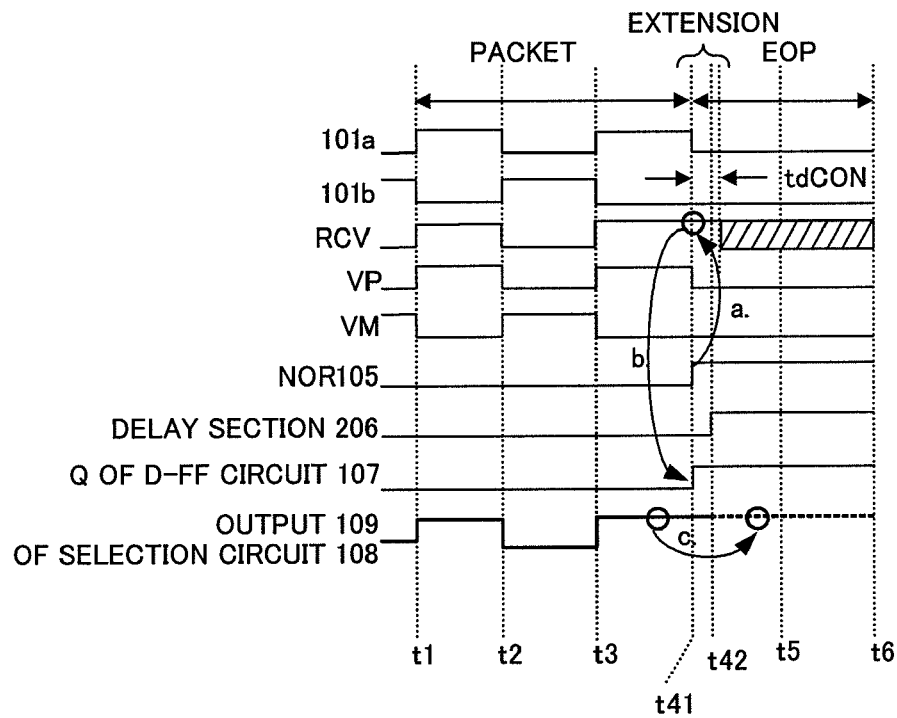
FIG. 6 is an operation waveform diagram of the data receiving apparatus according to this embodiment.
Figure 7:
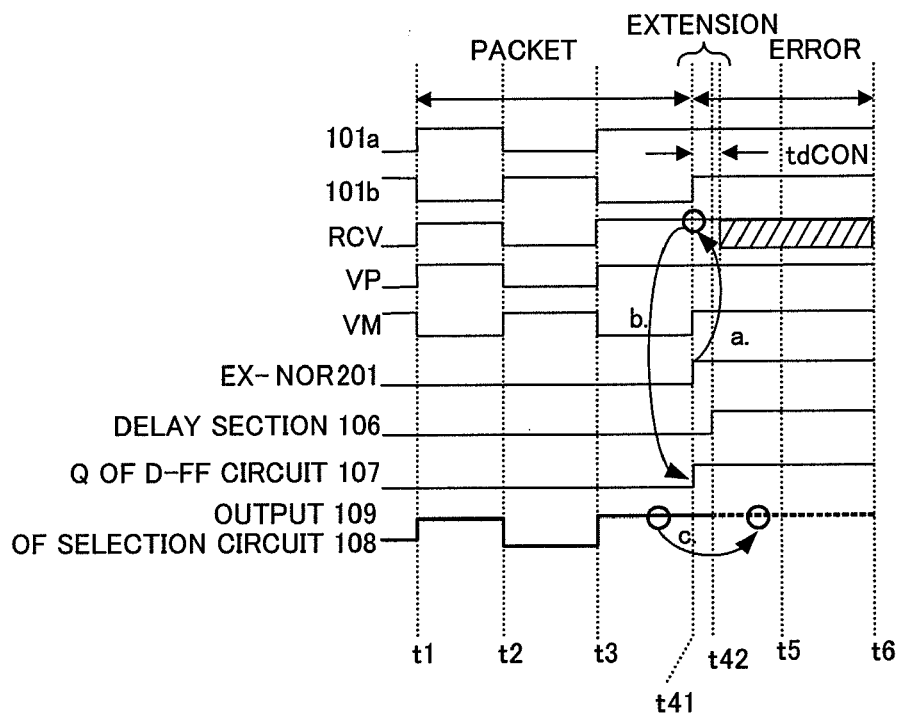
FIG. 7 is an operation waveform diagram of the data receiving apparatus according to this embodiment.

FIG. 6 and FIG. 7 are operation waveform diagrams that show a voltage condition of the data receiving apparatus. FIG. 6 shows the final state of packet transmission—in other words, the state where the output RCV of receiving comparator 102 immediately before entering EOP (times t3~t41) ends at high level maintains the high level after entering EOP.

In FIG. 6, times t1~t41 show packet transmission, out-of-phase signals are inputted at first signal line 101a and second signal line 101b, and the output RCV of receiving comparator 102 outputs a differential signal of the two signals. Further, since the outputs of noise canceling circuits 103 and 104 are out-of-phase with each other, the output of NOR circuit 105 becomes low level, and, since the trigger signal of D-FF circuit 107 is low level, D-FF circuit 107 does not retrieve data. Also, since the output of delay section 106 as well becomes low level at times t1~t41, selection circuit 108 selects the output RCV of receiving comparator 102, and outputs it.

Next, times t41~t6 show the EOP, and since low-level in-phase signals are inputted at both first signal line 101a and second signal line 101b, the output RCV of receiving comparator 102 enters an unreliable region at a point in time after a delay from time t41 only by transmission delay time tdCON (see the hatched RCV portion in FIG. 6). Also, since the outputs of noise canceling circuits 103 and 104 both become low level at t41, the output of NOR circuit 105 changes from low level to high level (see a. in FIG. 6), and becomes the rising trigger signal of D-FF circuit 107, D-FF circuit 107 retrieves and holds a high-level value before the output RCV of receiving comparator 102 enters an unreliable region (see b. in FIG. 6).

Also, since the output of NOR circuit 105 controls selection circuit 108 after a delay caused delay section 106, beyond the rising trigger signal of D-FF circuit 107, selection circuit 108 switches, at time t42, from the output RCV of receiving comparator 102 to output Q of D-FF circuit 107 and outputs it (see c. in FIG. 6). Accordingly, even when the output RCV of receiving comparator 102 becomes unreliable after time t42, since selection circuit 108 has switched to output Q of D-FF circuit 107, transition can be carried out with the output of selection circuit 108 maintaining a high level from time t3 to time t6.

FIG. 7 shows the final state of packet transmission—in other words, the case where the output RCV of receiving comparator 102 immediately before entering EOP (times t2~t31) ends at low level—and is maintains the low level after entering EOP. Times t1~t31 show packet transmission, out-of-phase signals are inputted at first signal line 101a and second signal line 101b, and the output RCV of receiving comparator 102 outputs a differential signal of the two signals. Further, since the outputs of noise canceling circuits 103 and 104 are out-of-phase with each other, the output of NOR circuit 105 becomes low level and since the trigger signal of D-FF circuit 107 becomes low level, and so D-FF circuit 107 does not retrieve data. Also, since the output of delay section 106 as well becomes low level at times t1~t31, selection circuit 108 selects the output RCV of receiving comparator 102, and outputs it.

Next, times t31~t5 show the EOP, and since low-level in-phase signals are inputted at first signal line 101a and second signal line 101b, the output RCV of receiving comparator 102 enters an unreliable region at a point in time after a delay from time t31 only by transmission delay time tdCON (see RCV hatched portion in FIG. 7). Also, since the outputs of noise canceling circuits 103 and 104 both become low level at t31, the output of NOR circuit 105 changes from low level to high level (see a. in FIG. 7) and becomes the rising trigger signal of D-FF circuit 107, D-FF circuit 107 retrieves and holds a low-level value before the output RCV of receiving comparator 102 enters an unreliable region (see b. in FIG. 7).

Also, since the output of NOR circuit 105 controls selection circuit 108 after a delay caused by delay section 106, beyond the rising trigger signal of D-FF circuit 107, selection circuit 108 switches, at time t32, from output RCV of receiving comparator 102 to output Q of D-FF circuit 107 and outputs it (see c. in FIG. 7).

Accordingly, even when the output RCV of receiving comparator 102 becomes unreliable after time t32, since the output of selection circuit 108 has switched to output Q of D-FF circuit 107, transition can be carried out with the output of selection circuit 108 maintaining a low level from time t3 to t5.

As described above, according to the present embodiment, data receiving apparatus 100 is provided with receiving comparator 102 with first signal line 101a and second signal line 101b for differential input; NOR circuit 105 which outputs a logical output, as a trigger signal, when the first signal and the second signal have changed from out-of-phase to in-phase; D-FF circuit 107 that retrieves, from NOR circuit 105 by means of the trigger signal, and holds the output RCV of receiving comparator 102; and selection circuit 108 that selects between and outputs the output RCV of receiving comparator 102 and the output Q of D-FF circuit 107; and in case where the first signal of first signal line 101a and the second signal of second signal line 101b are out-of-phase with each other, selection circuit 108 selects the output of receiving comparator 102, and, when the first signal and the second signal have changed from out-of-phase to in-phase, selection circuit 108 outputs a value held in D-FF circuit 107, as received data, and therefore, since the same voltage as that of the output of receiving comparator 102 immediately before entering the EOP period is outputted during the EOP period, it is possible to obtain reliable received data during the EOP period and the preceding period. In other words, as shown in FIG. 6 and FIG. 7, when the output of receiving comparator 102 immediately before entering the EOP period is high level (see c. in FIG. 6), the output during the EOP period is high level, and, when the output of receiving comparator 102 immediately before entering the EOP period is low level (see c. in FIG. 7), the output during the EOP period is low level, thereby making it possible to obtain reliable received data during the EOP period and the preceding period. Thus, since data receiving apparatus 100 makes it possible to stabilize USB communications during the EOP period and the preceding period, in the case this is applied to a USB interface circuit (for instance, USB transceiver), it is possible to prevent an unreliable state for input to subsequent electronic devices to which data receiving signal 109, input signals VP and VM are inputted.

Embodiment 2

Figure 8:
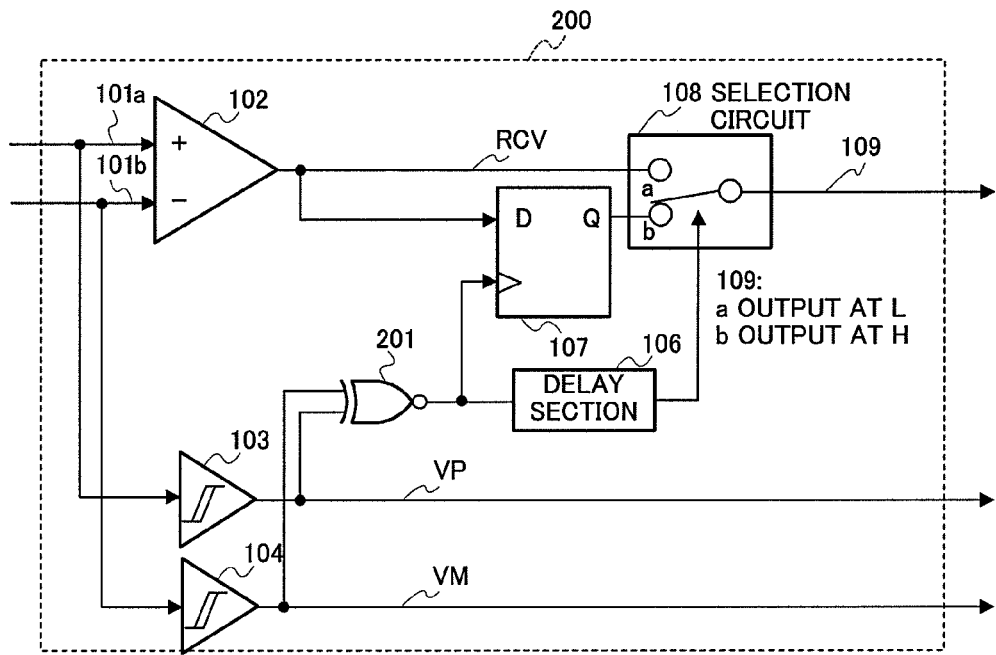
FIG. 8 is a circuit diagram showing a configuration of a data receiving apparatus according to embodiment 2 of the present invention.

FIG. 8 is a circuit diagram showing a configuration of a data receiving apparatus according to embodiment 2 of the present invention. In the description of the present embodiment, the same components as those of FIG. 4 are designated by the same reference numerals, and descriptions of overlapping parts will be omitted.

In FIG. 8, data receiving apparatus 200 is comprised of receiving comparator 102 with first signal line 101a and second signal line 101b as differential inputs; noise canceling circuits 103 and 104 comprised of Schmitt trigger circuits; EX-NOR circuit 201 which, upon receiving an input from noise canceling circuits 103 and 104, outputs a logical output, as a trigger signal, when the first signal and the second signal have changed from out-of-phase to in-phase; delay section 106 that delays an input signal by means of a multi-stage serial inverter; D-FF circuit 107 that retrieves, by means of the trigger signal from EX-NOR circuit 201, and holds the output RCV of receiving comparator 102; and selection circuit 108 which is comprised of a CMOS logic circuit and is adapted to select between and output the output RCV of receiving comparator 102 and the output Q of D-FF circuit 107.

Data receiving apparatus 200 is different in that it has an EX-NOR circuit 201 in place of NOR circuit 105 of FIG. 4.

Accordingly, in data receiving apparatus 100 of FIG. 4, the output of NOR circuit 105 changes to high level and becomes the rising trigger signal of D-FF circuit 107 only when the outputs of noise canceling circuits 103 and 104 both become low level. However, in data receiving apparatus 200 of the present embodiment, the output of EX-NOR circuit 201 changes to high level and is used as the trigger signal of D-FF circuit 107 both when the outputs of noise canceling circuits 103 and 104 are both low level and when they are high level.

Next, a description will be given of the operation of data receiving apparatus 200 having the above configuration.

Figure 9:
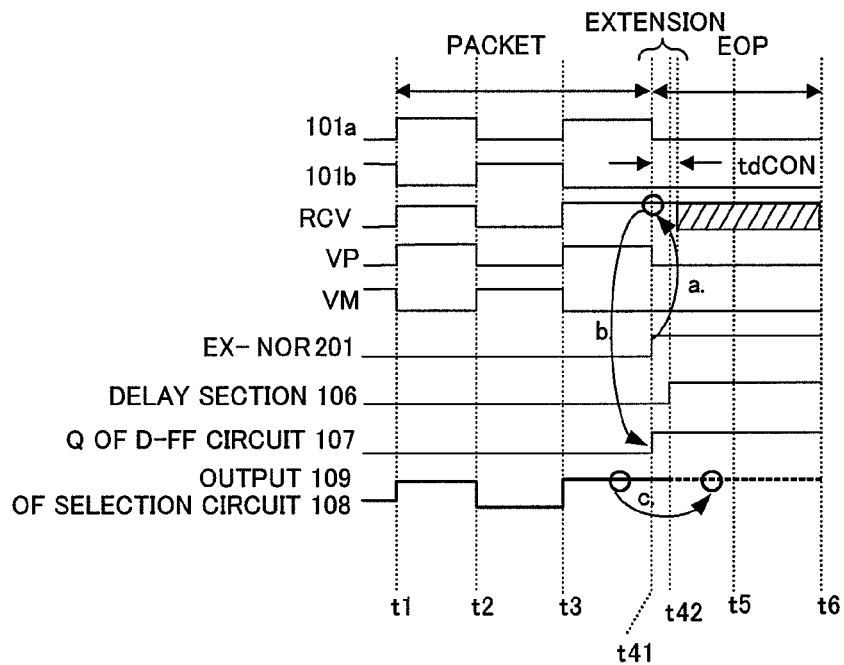
FIG. 9 is an operation waveform diagram of the data receiving diagram according to this embodiment.
Figure 10:
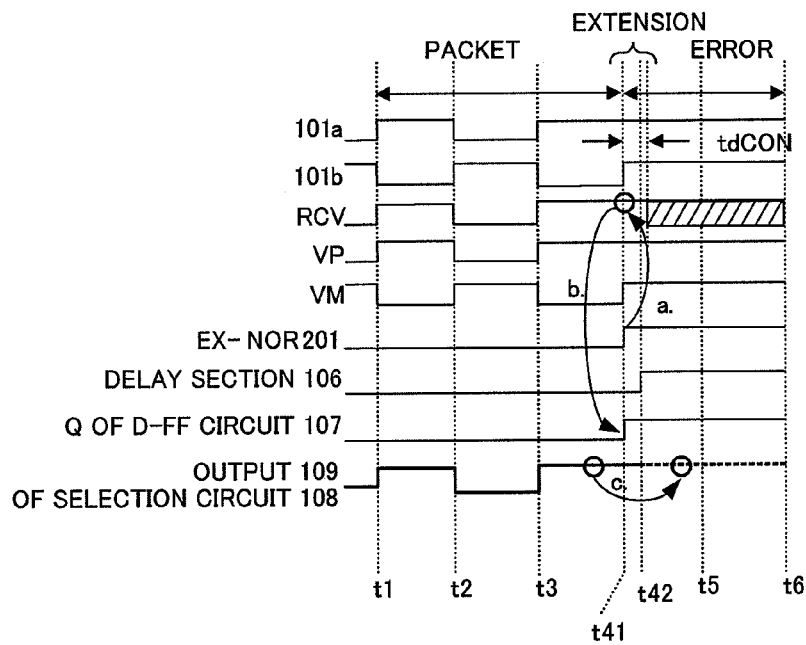
FIG. 10 is an operation waveform diagram of a data receiving diagram according to this embodiment.

FIG. 9 and FIG. 10 are operation waveform diagrams showing a voltage condition of the data receiving apparatus. FIG. 9 shows the final condition of packet transmission, in other words, the case where the output RCV of receiving comparator 102 immediately before entering EOP (times t3~t41) ends at high level and maintains the above high level after entering EOP.

Times t1~t41 show packet transmission, out-of-phase signals are inputted at first signal line 101a and second signal line 101b, and the output RCV of receiving comparator 102 outputs a differential signal of the two signals. Further, since the outputs of noise canceling circuits 103 and 104 are out-of-phase with each other, the output of EX-NOR circuit 201 becomes low level and the trigger signal of D-FF circuit 107 is low level, D-FF circuit 107 does not retrieve data. Also, since the output of delay section 106 as well becomes low level at the same time, at times t1~t31, selection circuit 108 selects the output RCV of receiving comparator 102, and outputs it.

Next, times t41~t6 show the EOP, and since low-level in-phase signals are inputted both at first signal line 101a and second signal line 101b, the output RCV of receiving comparator 102 enters an unreliable region at a point in time after a delay from time t41, only by transmission delay time tdCON (see hatched portion in FIG. 9). Also, since the outputs of noise canceling circuits 103 and 104 both become low level at t41, the output of EX-NOR circuit 201 changes from low level to high level (see a. in FIG. 9), and becomes the trigger signal of D-FF circuit 107, D-FF circuit 107 retrieves and holds a high-level value before the output RCV of receiving comparator 102 enters an unreliable region (see b. in FIG. 9).

Also, since the output of EX-NOR circuit 201 controls selection circuit 108 after a delay caused by delay section 106, beyond the rising trigger signal of D-FF circuit 107, selection circuit 108 switches, at time t42, from output RCV of receiving comparator 102 to output Q of D-FF circuit 107 and outputs it (see c. in FIG. 9). Accordingly, even when the output RCV of receiving comparator 102 becomes unreliable after time t42, since selection circuit 108 has switched to output Q of D-FF circuit 107, transition can be carried out with the output of selection circuit 108 maintaining a high level from time t3 to t6.

The final condition of the packet transmission—in other words, the case where the output RCV of receiving comparator 102 immediately before entering EOP (time t2~t41)—ends at low level and maintains the above low level after entering EOP, has been described above embodiment 1, with reference to FIG. 7. However, in the following embodiments which include the present embodiment, except that the output RCV of receiving comparator 102 differs, the operation is the same as when the output ends at high level, and therefore, description thereof will be omitted. In place of the operation description, a description will be given of the case where EOP changes into an error.

FIG. 10 shows the case where EOP of FIG. 9 has changed into an error. Error of EOP refers to the case where first signal line 101a and second signal line 101b are both at high level, which shows that USB communications are not carried out normally. Times t1~t41 show packet transmission and since the operation is the same as that of FIG. 9, description thereof will be omitted.

Times t41~t6 show the above error, and since high-level in-phase signals are inputted at both first signal line 101a and second signal line 101b, the output RCV of receiving comparator 102 enters an unreliable region at a point in time after a delay from time t41 only by transmission delay time tdCON (see the RCVhatched portion in FIG. 10). Also, since the outputs of noise canceling circuits 103 and 104 both become high level at time t41, the output of EX-NOR circuit 201 changes from low level to high level (see a. in FIG. 10), thus becoming the rising trigger signal of D-FF circuit 107, and D-FF circuit 107 retrieves and holds a high-level value before the output RCV of receiving comparator 102 enters an unreliable region (see b. in FIG. 10).

Also since the output of EX-NOR circuit 201 controls selection circuit 108 after a delay caused by delay section 106, beyond the rising trigger signal of D-FF circuit 107, selection signal 108 switches at time t42 from output RCV of receiving comparator 102 to output Q of D-FF circuit 107 and outputs it (see c. in FIG. 10). Accordingly, even when the output RCV of receiving comparator 102 after time t42 has become unreliable, since selection circuit 108 has switched to output Q of D-FF circuit 107, transition can be carried out with the output of selection circuit 108 maintaining a high level from time t3 to t6.

In this case, according to the present embodiment, since data receiving apparatus 200 includes, in place of NOR circuit 105, EX-NOR circuit 201 which outputs a logical output, as a trigger signal, when a first signal and a second signal have changed from out-of-phase to in-phase, it is possible to obtain the same effects as those of embodiment 1, in other words, it is possible to obtain reliable received data during the EOP period and the preceding period, and in addition, as shown in FIG. 10, it is possible to obtain reliable received data even when EOP changes to error and the output RCV of receiving comparator 102 has become unreliable.

Embodiment 3

Figure 11:
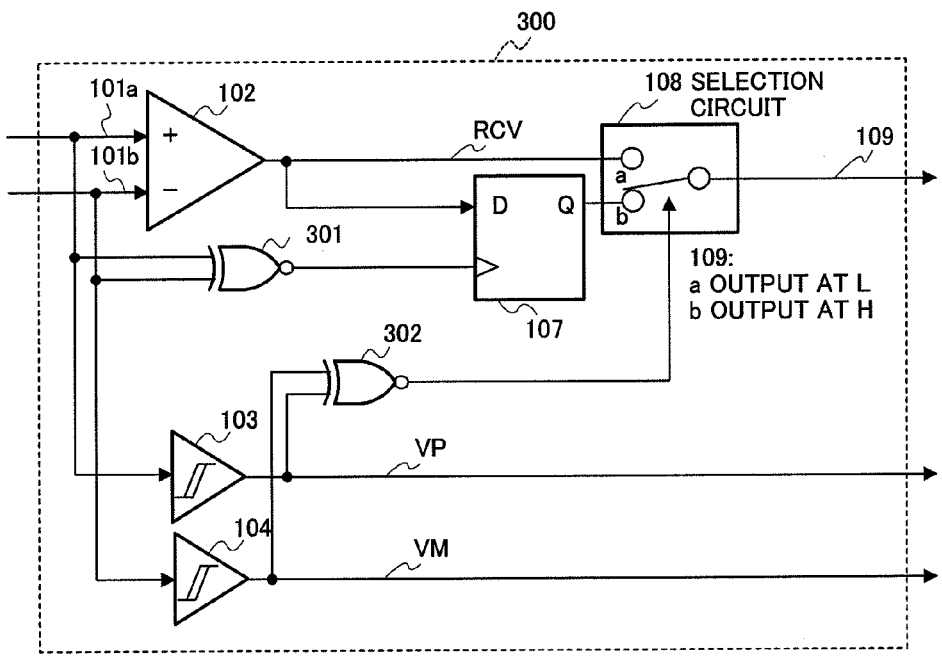
FIG. 11 is a circuit diagram showing a configuration of a data receiving apparatus according to embodiment 3 of the present invention.

FIG. 11 is a circuit diagram showing a configuration of a data receiving apparatus according to embodiment 3 of the present invention. In the description of the present embodiment, the same components as those of FIG. 8 are designated by the same reference numerals, and descriptions of overlapping parts will be omitted.

In FIG. 11, data receiving apparatus 300 is comprised of a receiving comparator 102 with first signal line 101a and second signal line 101b as differential inputs; noise canceling circuits 103 and 104 comprised of Schmitt trigger circuits; EX-NOR circuit 301 which is directly connected to first signal line 101a and second signal line 101b, and outputs a logical output, as a trigger signal, when the first signal and the second signal have changed from out-of-phase to in-phase; EX-NOR 302 which upon receiving the outputs of noise canceling circuits 103 and 104, outputs the logical signal obtained at the time the first signal and the second signal have changed from out-of-phase to in-phase, as control signal of selection circuit 108; D-FF circuit 107 that retrieves, by means of the trigger signal from EX-NOR circuit 301, and holds the output RCV of receiving comparator 102; and selection circuit 108 which is comprised of a CMOS logic circuit and is adapted to select between and output the output RCV of receiving comparator 102 and the output Q of D-FF circuit 107.

Data receiving apparatus 300 differs in that it is provided, in place of EX-NOR circuit 201 of FIG. 8, with EX-NOR circuit 301 which is directly connected to first signal line 101a and second signal line 101b, and in that it employs, in place of delay section 106, the operation delay of EX-NOR circuit 302. In other words, in data receiving apparatus 200 of FIG. 8, EX-NOR circuit 201 has been used as the trigger signal of D-FF circuit 107. In the present embodiment, the output of EX-NOR circuit 301 which is directly connected to first signal line 101a and second signal line 101b is used for the trigger signal of D-FF circuit 107, and the output of EX-NOR circuit 302 becomes the control signal for selection circuit 108 only.

Also, in data receiving apparatus 200 of FIG. 8, the trigger signal of D-FF circuit 107 is delayed by delay section 106 to obtain the control signal of selection circuit 108. In the present embodiment, the same delay effects as those in data receiving apparatus 200 of FIG. 8 are realized by a transmission delay time of EX-NOR circuit 301 alone and a total transmission delay time of noise canceling circuit 103 and 104, and EX-NOR circuit 302. In other words, the transmission delay time of EX-NOR circuit 302 with respect to first signal line 101a and second signal line 101b is longer than that of EX-NOR circuit 301 which is directly connected to first signal line 101a and second signal line 101b, only by the transmission delay time of noise canceling circuits 103 and 104.

Next, a description will be given of the operation of data receiving apparatus 300 having the above configuration.

Figure 12:
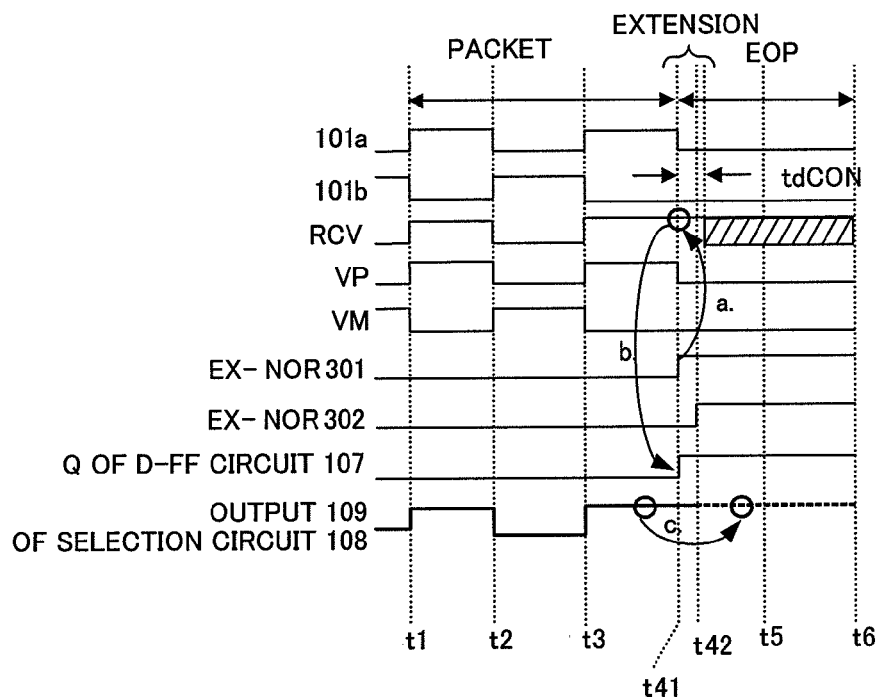
FIG. 12 is an operation waveform diagram of the data receiving apparatus according to this embodiment.
Figure 13:
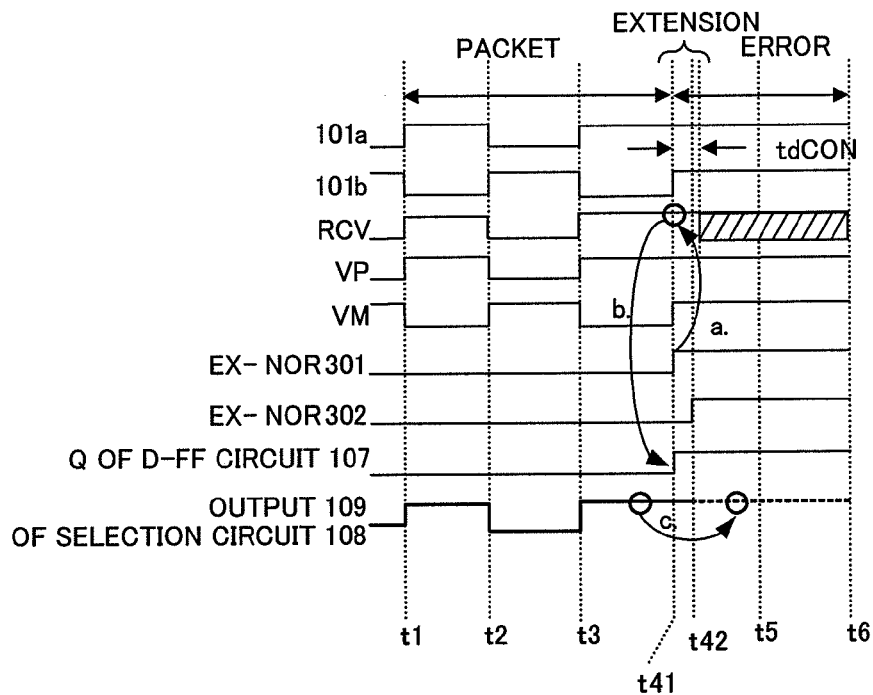
FIG. 13 is an operation waveform diagram of the data receiving apparatus according to the present embodiment.

FIG. 12 and FIG. 13 are operation waveform diagrams showing a voltage condition of the data receiving apparatus. FIG. 12 shows the final condition of packet transmission, in other words, the case where the output RCV of receiving comparator 102 immediately before entering EOP (times t3~t41) ends at high level and maintains the above high level after entering EOP.

Times t1~t41 show packet transmission, out-of-phase signals are inputted at first signal line 101a and second signal line 101b, and the output RCV of receiving comparator 102 outputs a differential signal of the two signals. Further, since the outputs of noise canceling circuits 103 and 104 are out-of-phase with each other, the output of EX-NOR circuit 301 becomes low level and the trigger signal of D-FF circuit 107 becomes low level, D-FF circuit 107 does not retrieve data. Also, since the output of EX-NOR circuit 302 as well becomes low level, selection circuit 108 selects the output RCV of receiving comparator 102, and outputs it.

Next, times t41~t6 show the EOP, and since low-level in-phase signals are inputted at both first signal line 101a and second signal line 101b, the output RCV of receiving comparator 102 enters an unreliable region at a point in time after a delay from time t41 only by transmission delay time tdCON (see RCV hatched portion in FIG. 12). Also, since the outputs of noise canceling circuits 103 and 104 both become low level at t41 and the output of EX-NOR circuit 301 changes from low level to high level (see a. in FIG. 12) and becomes the trigger signal of D-FF circuit 107, D-FF circuit 107 retrieves and holds a high-level value before the output RCV of receiving comparator 102 enters an unreliable region (see b. in FIG. 12).

Also, since the output of EX-NOR circuit 302 controls selection circuit 108 with a delay, as compared to the output of EX-NOR circuit 3012, selection circuit 108 switches, at time t42, from output RCV of receiving comparator 102 to output Q of D-FF circuit 107 and outputs it (see c. in FIG. 12). Accordingly, since the output of selection circuit 108 switches to the output Q of D-FF circuit 107 before the output RCV of receiving comparator after time t42 become unreliable, transition can be carried out with the output of selection circuit 108 maintaining a high level from time t3 to time t6.

FIG. 13 shows the case where EOP of FIG. 12 has changed into error. As described in embodiment 2, this error refers to the case where first signal line 101a and second signal line 101b are both at high level, which shows that USB communications are not carried out normally. Times t1~t41 show packet transmission and since the operation is the same as that of FIG. 12, description thereof will be omitted.

Next, times t41~t6 show the above error, and since high-level in-phase signals are inputted at both first signal line 101a and second signal line 101b, the output RCV of receiving comparator 102 enters an unreliable region at a point in time after a delay from time t41 only by transmission delay time tdCON (see the RCV hatched portion in FIG. 13). Also, since the outputs of noise canceling circuits 103 and 104 both become high level at time t41 and the output of EX-NOR circuit 3012 changes from low level to high level (see a. in FIG. 13), D-FF circuit 107 retrieves and holds a high-level value before the output RCV of receiving comparator 102 enters an unreliable region (see b. in FIG. 13b).

Also since the output of EX-NOR circuit 302 controls selection circuit 108 with a delay, as compared to the rising trigger signal of D-FF circuit 107, selection circuit 108 switches at time t42 from output RCV of receiving comparator 102 to output Q of D-FF circuit 107 and outputs it (see c. in FIG. 13). Accordingly, since selection circuit 108 has switched to output Q of D-FF circuit 107 before the output RCV of receiving comparator 102 becomes unreliable after time t42, transition can be carried out with the output of selection circuit 108 maintaining a high level from time t3 to t6.

In this way, according to the present embodiment, data receiving apparatus 300 employs the logical output of EX-NOR circuit 301 which is directly connected to first signal line 101a and second signal line 101b, as the trigger signal of D-FF circuit 107, and is not provided with delay section 106. In other words, data receiving apparatus 300 generates a trigger signal from the first signal of first signal line 101a and the second signal of second signal line 101b which are earliest in terms of time, and D-FF circuit 107 retrieves the output RCV of receiving comparator 102 by means of this trigger signal, so that D-FF circuit 107 is able to finish a data holding operation relatively fast, as compared to selection circuit 108, thereby leading to an effect that delay section 106 is no longer required. Also, improvement of overall data receiving operation time of data receiving apparatus 300 can also be expected.

Embodiment 4

Figure 14:
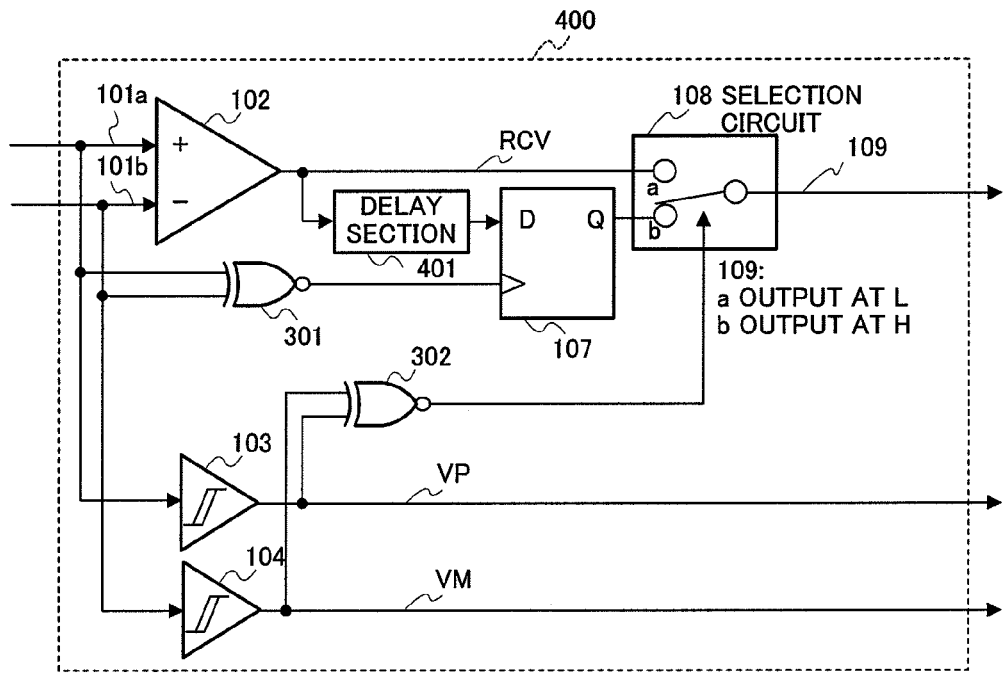
FIG. 14 is a circuit diagram showing a configuration of a data receiving apparatus according to embodiment 4 of the present invention.

FIG. 14 is a circuit diagram showing a configuration of a data receiving apparatus according to embodiment 4 of the present invention. In the description of the present embodiment, the same components as those of FIG. 11 are designated by the same reference numerals, and descriptions of overlapping parts will be omitted.

In FIG. 14, data receiving apparatus 400 is comprised of a receiving comparator 102 with first signal line 101a and second signal line 101b as differential inputs; noise canceling circuits 103 and 104 comprised of Schmitt trigger circuits; EX-NOR circuit 301 which is directly connected to first signal line 101a and second signal line 101b, and outputs a logical output, as a trigger signal, when the first signal and the second signal have changed from out-of-phase to in-phase; EX-NOR 302 which, upon receiving the outputs of noise canceling circuits 103 and 104, outputs a logic output obtained at the time the first signal and the second signal have changed from out-of-phase to in-phase, as a control signal of selection circuit 108; delay section 401 that delays the output RCV of receiving comparator 102; D-FF circuit 107 that retrieves, by means of the trigger signal from EX-NOR circuit 301, and holds the output RCV of receiving comparator 102 which has been delayed by delay section 401; and selection circuit 108 which is comprised of a CMOS logic circuit and is adapted to select between and output the output RCV of receiving comparator 102 and the output Q of D-FF circuit 107.

Here, delay section 401 is provided at the data input terminal of D-FF circuit 107, and the timing of data input to D-FF circuit 107 and selection circuit 108 is adjusted. Similarly with delay section 106 of FIG. 5, delay section 401 is comprised, for instance, of a serially connected inverter.

In data receiving apparatus 300 of FIG. 11, the output RCV of receiving comparator 102 has been directly inputted at the data terminal of D-FF circuit 107. In the present embodiment, the output RCV of receiving comparator 102 is inputted at the data terminal of D-FF circuit 107 via delay section 401. Accordingly, when the output of EX-NOR circuit 301 becomes the trigger signal of D-FF circuit 107, since output RCV of receiving comparator 102 is inputted with a further delay which is caused by delay section 401, D-FF circuit 107 can retrieve RCV data in a more reliable manner.

Next, a description will be given of the operation of data receiving apparatus 400 having the above configuration.

Figure 15:
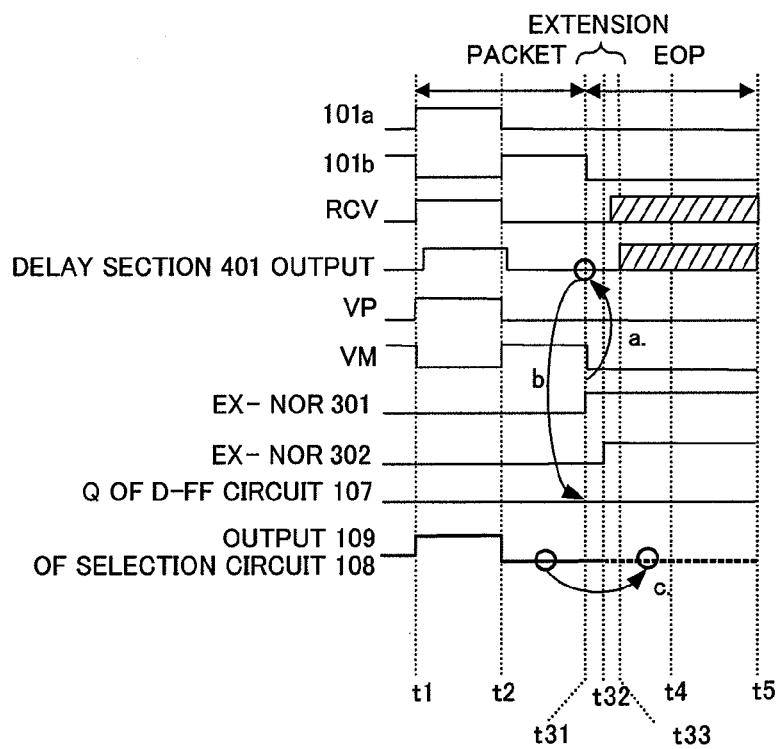
FIG. 15 is an operation waveform diagram of the data receiving apparatus according to this embodiment.
Figure 16:
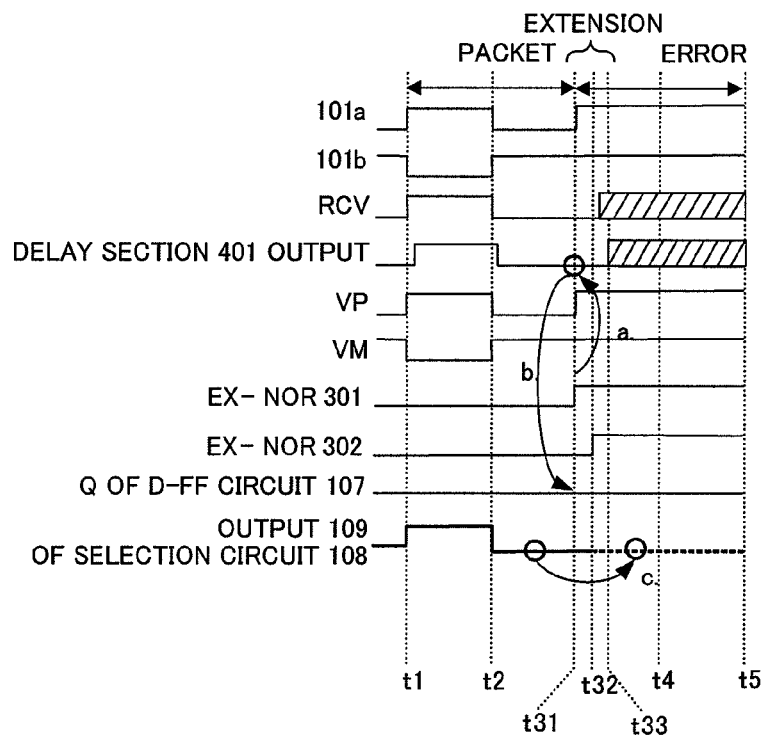
FIG. 16 is an operation waveform diagram of the data receiving apparatus according to this embodiment.

FIG. 15 and FIG. 16 are operation waveform diagrams showing a voltage condition of the data receiving apparatus. FIG. 15 shows the final condition of packet transmission, in other words, the case where the output RCV of receiving comparator 102 immediately before entering EOP (times t2~t31) ends at low level and maintains the above low level after entering EOP.

Times t1~t31 show packet transmission, out-of-phase signals are inputted at first signal line 101a and second signal line 101b, and the output RCV of receiving comparator 102 outputs a differential signal of the two signals. Although at this time, delay section 401 outputs the output RCV of receiving comparator 102 to data terminal of D-FF circuit 107 with a certain delay, since the outputs of noise canceling circuits 103 and 104 are out-of-phase with each other, the output of EX-NOR circuit 301 becomes low level, and since the trigger signal of D-FF circuit 107 is low level, D-FF circuit 107 does not retrieve data. Also, since the output of EX-NOR circuit 302 as well becomes low level, selection circuit 108 selects the output RCV of receiving comparator 102, and outputs it.

Next, times t31~t5 show the EOP, and since low-level in-phase signals are inputted at both first signal line 101a and second signal line 101b, the output RCV of receiving comparator 102 enters an unreliable region at a point in time after a delay from time t41 only by transmission delay time tdCON (see the RCV hatched portion in FIG. 15). Also, since the outputs of noise canceling circuits 103 and 104 both become low level at t31, the output of EX-NOR circuit 301 changes at the same time from low level to high level (see a. in FIG. 15). Also, since the unreliable region of output RCV of receiving comparator 102 is extended by delay section 401 until t33

(see the hatched portion of the output of delay section 401 in FIG. 15), D-FF circuit 107 can retrieve and hold a low level value before the output RCV of receiving comparator 102 enters the unreliable region, at a time t31 which is considerably earlier than t33 (see b. in FIG. 15). Also, since the output of EX-NOR circuit 302 controls selection circuit 108 with a delay, as compared to the output of EX-NOR circuit 3012, selection circuit 108 switches, at time t32, from output RCV of receiving comparator 102 to output Q of D-FF circuit 107 and outputs it (see c. in FIG. 15). Accordingly, even when the output RCV of receiving comparator 102 has become unreliable after time t32, since selection circuit 108 has switched to the output Q of D-FF circuit 107, transition can be carried out with the output of selection circuit 108 maintaining a high level from time t2 to t5.

FIG. 16 shows the case where EOP of FIG. 15 has changed into error. As described in embodiment 2, this error refers to the case where first signal line 101a and second signal line 101b are both high level, which shows that USB communications are not carried out normally. Times t1~t31 show packet transmission and since the operation is the same as that of FIG. 15, description thereof will be omitted.

Next, times t31~t5 show the above error, and since high-level in-phase signals are inputted at both first signal line 101a and second signal line 101b, the output RCV of receiving comparator 102 enters an unreliable region at a point in time after a delay from time t31 only by transmission delay time tdCON (see the RCV hatched portion in FIG. 16). Also, since the outputs of noise canceling circuits 103 and 104 both become high level at t31, the output of EX-NOR circuit 301 changes, at the same time, from low level to high level (see a. in FIG. 16). Also, since the unreliable region of output RCV of receiving comparator 102 is extended by delay section 401 up to t33 (see the hatched portion of the output of delay section 401 in FIG. 16), D-FF circuit 107 can retrieve and hold a low level value before the output RCV of receiving comparator 102 enters the unreliable region, at a time t31 which is considerably earlier than t33 (see b. in FIG. 16). Also since the output of EX-NOR circuit 302 controls selection circuit 108 with a delay, as compared to the output of EX-NOR circuit 3012, selection circuit 108 switches at time t32 from output RCV of receiving comparator 102 to output Q of D-FF circuit 107 and outputs it (see c. of FIG. 16). Accordingly, even when the output RCV of receiving comparator 102 has become unreliable after time t32, since selection circuit 108 has switched to output Q of D-FF circuit 107, transition can be carried out with the output of selection circuit 108 maintaining a low level from time t2 to t5.

In this way, according to the present embodiment, since data receiving apparatus 400 is provided with delay section 401 that delays the output RCV of receiving comparator 102, it is possible to reliably retrieve and hold a value before the output RCV of receiving comparator 102 enters the unreliable region, as shown in FIG. 15 and FIG. 16, which makes it possible to obtain reliable received data during EOP period and the preceding period, in a more reliable manner.

Embodiment 5

Figure 17:
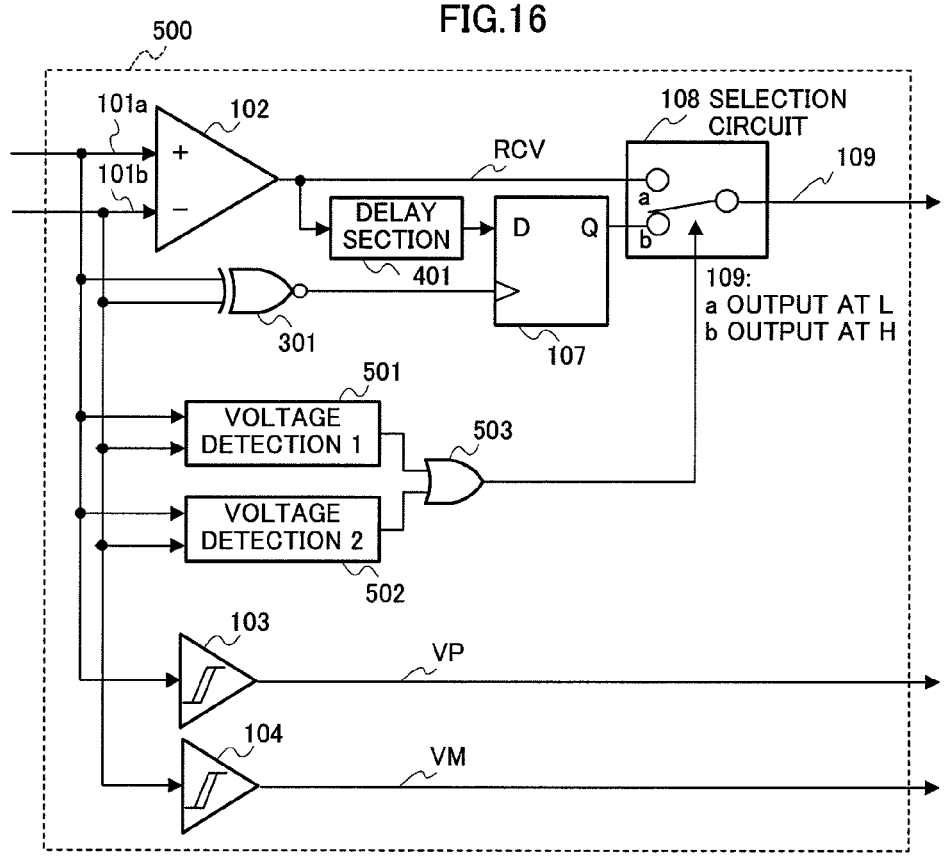
FIG. 17 is a circuit diagram showing a configuration of a data receiving apparatus according to embodiment 5 of the present invention.

FIG. 17 is a circuit diagram showing a configuration of a data receiving apparatus according to embodiment 5 of the present invention. In the description of the present embodiment, the same components as those of FIG. 14 are designated by the same reference numerals, and descriptions of overlapping parts will be omitted.

In FIG. 17, data receiving apparatus 500 is comprised of a receiving comparator 102 with first signal line 101a and second signal line 101b for differential inputs; noise canceling circuits 103 and 104 comprised of Schmitt trigger circuits; EX-NOR circuit 301 which is directly connected to first signal line 101a and second signal line 101b, and outputs a logical output, as a trigger signal, when the first signal and the second signal have changed from out-of-phase to in-phase; delay section 401 that delays output RCV of receiving comparator 102; D-FF circuit 107 that retrieves, by means of the trigger signal from EX-NOR circuit 301, and holds the output RCV of receiving comparator 102 which has been delayed by delay section 401; voltage detection circuit (voltage detection circuit <1>) that detects a voltage level at which the potentials of first signal line 101a and second signal line 101b become equal to or below a low-level threshold value VTL at the same time; voltage detection circuit 502 (voltage detection circuit <2>) that detects a voltage level at which the potentials of first signal line 101a and second signal line 101b become equal to or higher than a high-level threshold value VTH at the same time; OR circuit 503 that outputs an OR logical output of voltage detection circuit 501 and voltage detection circuit 502 as a control signal to selection circuit 108; and selection circuit 108 which is comprised of a CMOS logic circuit and is adapted to select between and output the output RCV of receiving comparator 102 and the output Q of D-FF circuit 107.

The input of EX-NOR circuit 301 is directly connected to first signal line 101a and second signal line 101b, and the inputs of voltage detection circuit 501 and voltage detection circuit 502 are respectively connected to first signal line 101a and second signal line 101b. The outputs of voltage detection circuit 501 and voltage detection circuit 502 become the control signals of selection circuit 108, via OR circuit 503.

When the potentials of first signal line 101a and second signal line 101b become equal to or lower than a low-level threshold value VTL at the same time, voltage detection circuit 501 is a NOR-type voltage detection circuit that outputs at high level; and when the potentials of first signal line 101a and second signal line 101b become equal to or higher than a high-level threshold value VTH at the same time, voltage detection circuit 502 is an AND-type voltage detection circuit that outputs at high level. The circuit configuration will be described in more detail with reference to FIG. 18.

In particular, voltage detection circuit 501 and voltage detection circuit 502 are required when the voltages of first signal line 101a and second signal line 101b are to be determined accurately, and they are realized by analog circuits such as MOS-type differential amplifiers, or the like which generally employ a plurality of transistors. Accordingly, the output of OR circuit 503 is high level when first signal line 101a and second signal line 101b become equal to or lower than a low-level threshold value VTL at the same time, and when they become equal to or higher than a high-level threshold value VTH at the same time. Also, voltage detection circuit 501 and voltage detection circuit 502 have a noise cancellation function, and since noise canceling circuits 103 and 104 can be substituted for voltage detection circuit 501 and voltage detection circuit 502, their outputs are not employed to generate a control signal for selection circuit 108.

Figure 18:
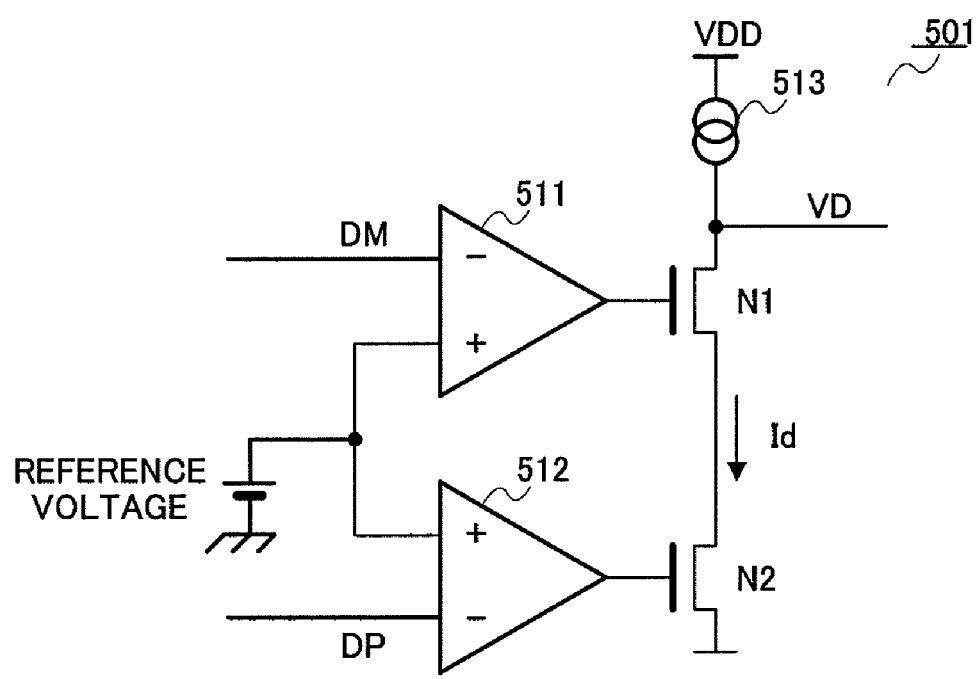
FIG. 18 is a view showing a detailed configuration of a voltage detection circuit of the data receiving apparatus according to this embodiment.

FIG. 18 is a circuit diagram showing a detailed configuration of the above voltage detection circuits 501 and 502, and since voltage detection circuits 501 and 502 employ substantially the same configuration, voltage detection circuit 501 is illustrated as representative.

In FIG. 18, voltage detection circuit 501 is comprised of comparators 511 and 512, NchMOS transistors N1 and N2, and constant current source 513. An input signal DM of second signal line 101b is connected to the negative-side input terminal of comparator 511, an input signal DP of first signal line 101a is connected to the negative-side input terminal of comparator 512, and a reference voltage (for instance 0.7V) is connected to the positive-side input terminal of comparators 511 and 512. When the potentials of first signal line 101a and second signal line 101b become equal to or lower than a low-level threshold value VTL at the same time, NchMOS transistors N1 and N2 both go off, and voltage detection circuit 501 outputs output VD.

Next, a description will be given of the operation of data receiving apparatus 500 having the above configuration.

Figure 19:
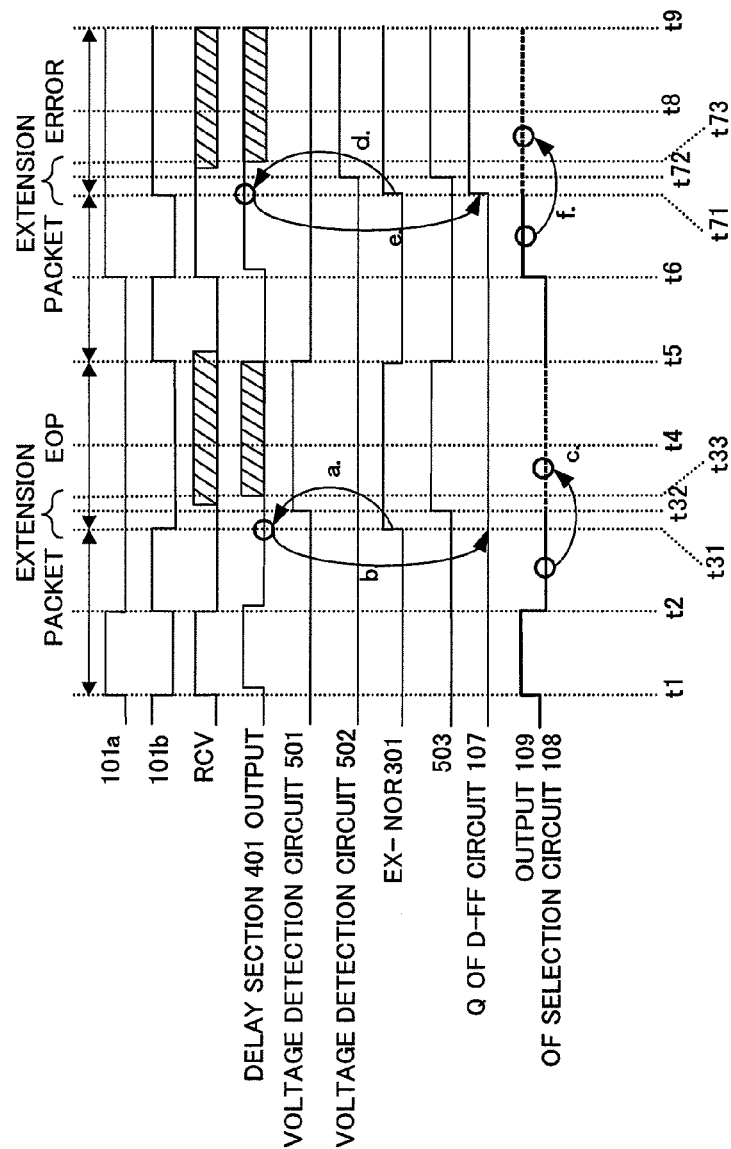
FIG. 19 is an operation waveform diagram of the data receiving apparatus according to this embodiment.

FIG. 19 is an operation waveform diagram showing a voltage condition of the data receiving apparatus. FIG. 19 shows the case where, in a final state of packet transmission immediately before entering EOP (times t2~t3), the output RCV of receiving comparator 102 ends at low level and maintains the above low level after entering EOP, and the case where, in a final state of packet transmission immediately before entering error (times t6~t71), the output RCV of receiving comparator 102 ends at high level and maintains the above high-level after entering error. Times t1~t31 show packet transmission, out-of-phase signals are inputted at first signal line 101a and second signal line 101b, and the output RCV of receiving comparator 102 outputs a differential signal thereof. Also, although delay section 401 outputs output RCV of receiving comparator 102 to data terminal of D-FF circuit 107 with a certain delay, since the output of EX-NOR circuit 301 becomes low level, the trigger signal of D-FF circuit 107 becomes low level and D-FF circuit 107 does not retrieve data. Also, since voltage detection circuit 501 and voltage detection circuit 502 output at low level at t1~t31, the output of OR circuit 503 becomes low level as well, and selection circuit 108 selects the output RCV of receiving comparator 102 and outputs it.

Next, times t31~t5 show the EOP, and since low-level in-phase signals are inputted both at first signal line 101a and second signal line 101b, the output RCV of receiving comparator 102 enters an unreliable region at a point in time after a delay from time t31 only by transmission delay time tdCON (see the RCV hatched portion in FIG. 19). At time t31, first, the output of EX-NOR circuit 301 changes from low level to high level at the same time (see a. of FIG. 19). Further, since the unreliable region of the output RCV of receiving comparator 102 is extended by delay section 401 up to time t33 (see the hatched portion of the output of delay section 401 of FIG. 19), D-FF circuit 107 can retrieve and hold a low-level value before the output RCV of receiving comparator 102 enters an unreliable region, at a time t31 considerably earlier than time t33 (see b. in FIG. 19).

Next, since at time t32, voltage detection circuit 501 and OR circuit 503 change from low level to high level and control selection circuit 108, selection circuit 108 switches, at time t32, from output RCV of receiving comparator 102 to output Q of D-FF circuit 107, and outputs it. Accordingly, even when the output RCV of receiving comparator 102 becomes unreliable after time t32, since the output of selection circuit 108 is switched to output Q of D-FF circuit 107, transition can be carried out with the output of selection circuit 108 maintaining a low level from time t2 to t5 (see c. in FIG. 19).

Next, times t5 to t71 show packet transmission, and since the operation is the same as from time t1 to t31, description thereof will be omitted.

Further, times t72~t9 show the above error, and since high-level in-phase signals are inputted at both first signal line 101a and second signal line 101b, the output RCV of receiving comparator 102 enters an unreliable region at a point in time after a delay from time t731 only by transmission delay time tdCON (see the RCV hatched portion in FIG. 19). Also, at first time t71, the output of EX-NOR circuit 301 changes from low level to high level at the same time. Also, since the unreliable region of output RCV of receiving comparator 102 is extended by delay section 401 up to t73 (see the hatched portion of the output of delay section 401 in FIG. 19), D-FF circuit 107 can retrieve and hold a low level value before the output RCV of receiving comparator 102 enters an unreliable region, at a time t71 which is considerably earlier than t73 (see d. in FIG. 19). Next, since voltage detection circuit 5021 and OR circuit 503 change from low level to high level at time t72 and control selection circuit 108, selection circuit 108 switches at time t72 from the output RCV of receiving comparator 102 to output Q of D-FF circuit 107, and outputs it (see e. in FIG. 19). Accordingly, even when the output RCV of receiving comparator 102 becomes unreliable after time t72, since the output of selection circuit 108 is switched to output Q of D-FF circuit 107, transition can be carried out with the output of selection circuit 108 maintaining a low level from time t2 to t65 (see f. in FIG. 19).

In this way, according to the present embodiment, data receiving apparatus 500 is provided with voltage detection circuits 501 and 502 that detect a voltage level at which the potentials of first signal line 101a and second signal line 101b become a predetermined threshold value at the same time, and since this output becomes the control signal of selection circuit 108, via OR circuit 503, it is possible to change the timing of the data switching operation carried out by selection circuit 108 by adjusting a threshold value voltage. Accordingly, at the time of implementing data receiving apparatus 500 as a receiving circuit such as a USB transistor or the like, the apparatus can be easily adjusted and, in addition, it can be applied to a large variety of applications.

The above description is an exemplification of the preferred embodiments of the present invention, but the scope of the present invention is not limited thereto. For instance, although, in the above embodiment, a description was given of an example which uses a CMOS circuit for the logic circuit, any kind of MOS circuit may be used. That is to say, it is sufficient that the above logic circuits operate faster as a whole, compared to receiving comparator 102. Also, it is needless to say that the CMOS circuit is advantageous in terms of power consumption.

Figure 1:
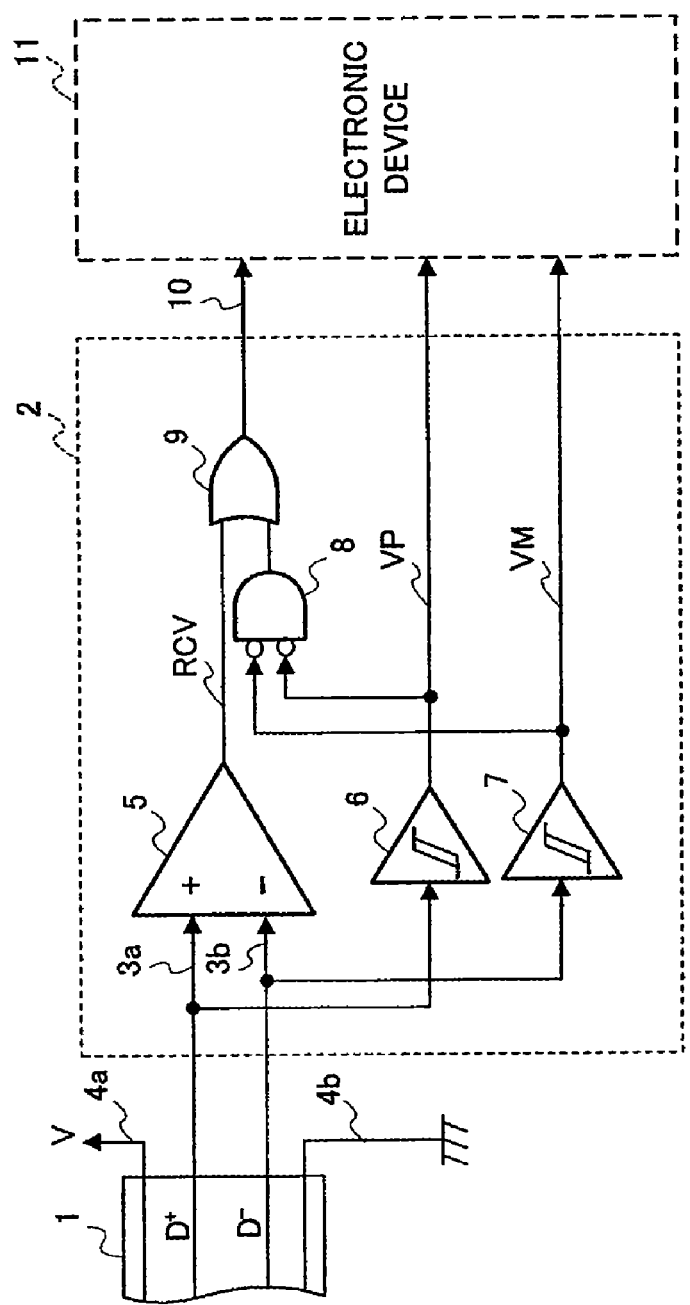
FIG. 1 is a circuit configuration diagram showing a conventional data receiving apparatus.
Figure 2:
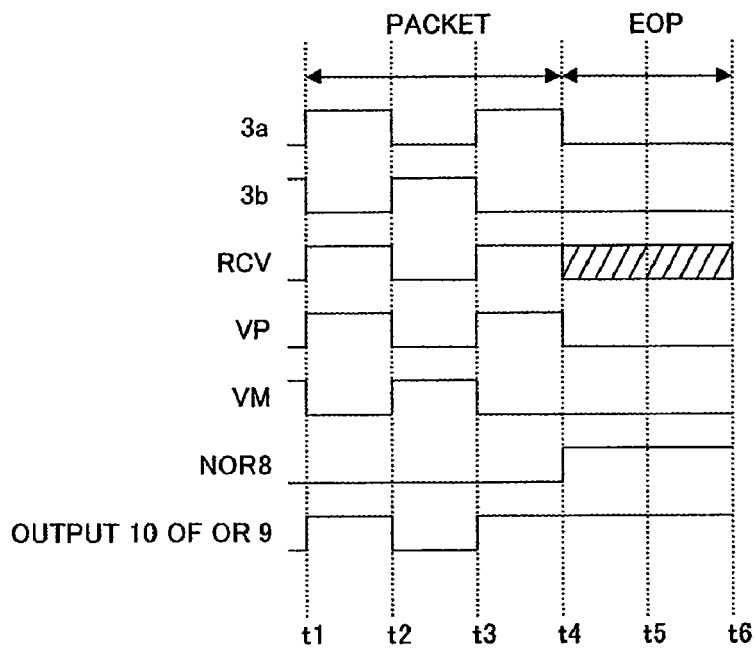
FIG. 2 is an operation waveform diagram of the conventional data receiving apparatus.
Figure 3:
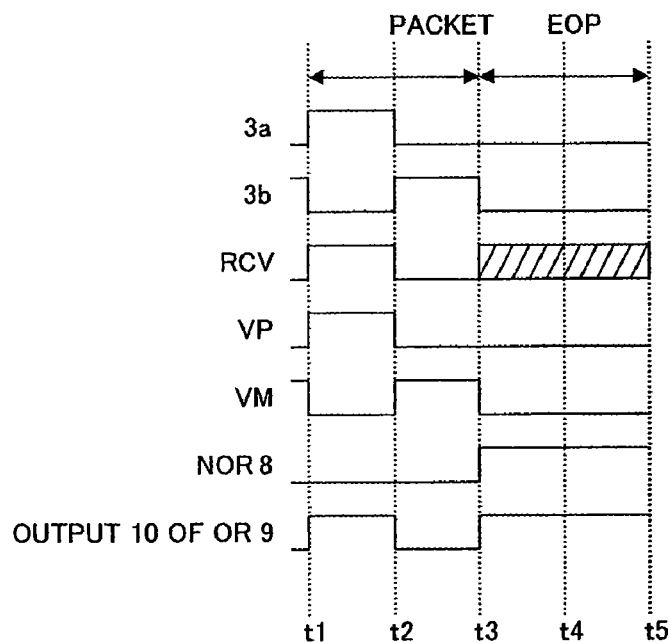
FIG. 3 is an operation waveform diagram showing the conventional data receiving apparatus.

Also, although the above embodiments are examples of an application to a data receiving apparatus of a USB device, any kind of receiving circuit may be used so long as it is adapted to receive both differential out-of-phase signals, with respect to the differential-format signals of the USB. For instance, this can be used as a substitute for the conventional data receiving apparatus of the above FIG. 1, and the output signals and the connection detection signals are transmitted to subsequent electronic devices. These electronic devices can be applied to different types of electronic devices including portable devices.

Also, although, in the present embodiment, the name "data receiving apparatus" was used, this is for the convenience of description, and it is obvious that "data receiving circuit," "USB interface," "USB device" or the like may also be used.

Further, the type, number, connection method, etc. of the respective circuit sections, such as the delay section, the D-FF circuit and the like, for instance, that constitute the above data receiving apparatus are not limited to the above embodiments.

As described above, according to the present invention, it is possible to obtain reliable received data during an EOP period and a preceding period, and to receive serial data in a reliable manner. Also, it is possible to obtain reliable received data even when error of the EOP occurs. Thus, the unreliable state of the input to subsequent electronic devices of the data receiving apparatus can be prevented.

Accordingly, the data receiving apparatus according to the present invention implements a data receiving apparatus that enables reliable reception when differential format signals of USB are out-of-phase signals (i.e. different voltage levels) and when the differential format signals of USB are in-phase signals (i.e. the same voltage level), and is applicable to data processing technologies for USB transceivers. power supply apparatus and the power supply method of the present invention are useful as a power supply for a CPU which reduces power consumption by controlling the power supply voltage, and for a power supply apparatus of an electronic device with large fluctuations of current consumption. Also, it may also be widely applied to power supply apparatus used in power supply circuits for electronic devices such as CPU or in electronic devices other than mobile devices.

What is claimed is:

1. A data receiving apparatus that receives serial data of a first signal line and a second line, the data receiving apparatus comprising:
   a comparator that uses the first signal line and the second signal line for a differential input;
   a trigger generation section that generates a trigger signal before an output of the comparator switches, when a first signal and a second change from out-of phase to in-phase;
   a storage section that retrieves, by means of the trigger signal, and stores the output before the comparator switches, when the first signal and the second signal change from out-of-phase to in-phase; and
   a selection that, when a first signal of the first signal line and a second signal of the second signal line are out-of-phase with each other, selects the output of the comparator and outputs the output as received data, and, when the first signal and the second signal change from out-of-phase to in-phase, switches from the output of the comparator to a value stored in the storage section and outputs the value as received data.

2. The data receiving apparatus according to claim 1, wherein the trigger generation section is directly connected to the first signal lien and the second signal line, and generates the trigger signal from the first signal of the first signal line and the second signal of the second signal line.

3. The data receiving apparatus according to claim 1, wherein the trigger generation section is comprised of a logic circuit.

4. The data receiving apparatus according to claim 1, wherein the trigger generation section comprises a NOR gate, and the first signal of the first signal line and the second signal of the second line are in-phase when the first signal and the second signal have a lower voltage than a threshold value voltage of the NOR gate.

5. The data receiving apparatus according to claim 1, wherein the trigger generation section comprises and EX-NOR gate, and the first signal of the first signal line and the second signal of the second signal line are in-phase when the first signal and the second signal have a lower voltage and a higher voltage than a threshold value voltage of the EX-NOR gate.

6. The data receiving apparatus according to claim 1, wherein the storage section stores the output of the comparator immediately before entering an EOP (end-of-packet) period.

7. The data receiving apparatus according to claim 1, wherein, when the first signal and the second signal have changed from out-of-phase to in-phase upon receipt of the trigger signal as a control signal, the selection section switches from the output of the comparator to a value stored in the storage section and outputs the value.

8. The data receiving apparatus according to claim 1, wherein the selection section outputs the output of the comparator immediately before entering an EOP period and which is stored in the storage, as received data in the EOP period.

9. The data receiving apparatus according to claim 1, further comprising a delay section that delays the trigger signal, wherein:
   the storage section retrieves, by means of a trigger signal which does not pass through the delay section, and stores an output before the comparator switches; and
   the selection section, upon receiving the trigger signal delayed by the delay section, as a control signal, switches from the output of the comparator to a value stored in the storage section and outputs the value at a later time than the time stored in the storage section.

10. The current receiving apparatus according to claim 1, comprising a delay section that delays the output of the comparator,
    wherein the storage section retrieves, by means of the trigger signal, and stores an output of the comparator before the comparator switches when the first signal and the second signal change from out-of-phase to in-phase, and which has been delayed by the delay section.

11. The data receiving apparatus according to claim 9, wherein the delay section delays the trigger signal by an operation delay time of an inverter or a logical gate.

12. The data receiving apparatus according to claim 1, wherein:
    the comparator is an analog comparator; and
    at least one of the trigger generation section, the storage section and the selection section are comprised of a gate circuit which includes a CMOS logic circuit.

13. The data receiving apparatus according to claim 9, further comprising a second delay section that delays the output of the comparator,
    wherein the storage section retrieves, by means of the trigger signal, and stores an output of the comparator before the comparator switches when the first signal and the second signal change from out-of-phase to in-phase, and which has been delayed by the second delay section.

14. The data receiving apparatus according to claim 13 wherein the delay section and the second delay section delay the signal by an operation delay time of an inverter or a logical gate.

* * * * *